United States Patent [19]
Fujiwara et al.

[11] Patent Number: 5,172,164
[45] Date of Patent: Dec. 15, 1992

[54] IMAGE FORMING APPARATUS WITH MICROCAPSULES DISPERSED IN THE PHOTOCONDUCTIVE MEMBER

[75] Inventors: Mitsugu Fujiwara, Morioka; Makoto Tomoyori, Iwate; Kazuyoshi Sasaki, Morioka, all of Japan

[73] Assignee: Alps Electric Co., Ltd., Tokyo, Japan

[21] Appl. No.: 622,676

[22] Filed: Dec. 4, 1990

[30] Foreign Application Priority Data

Dec. 21, 1989 [JP] Japan ................... 1-329568

[51] Int. Cl.⁵ .............................. G03G 5/00
[52] U.S. Cl. .................. 355/212; 355/202; 359/51
[58] Field of Search ............ 355/200, 210, 211, 212, 355/271, 27, 32, 35; 430/227, 228, 269, 292, 296, 346; 346/160; 359/41, 51, 52, 70, 77, 194, 100

[56] References Cited

U.S. PATENT DOCUMENTS

| | | | |
|---|---|---|---|
| 4,541,706 | 9/1985 | Kishi | 346/160 X |
| 4,545,669 | 10/1985 | Hays et al. | 430/55 X |
| 4,603,945 | 8/1986 | Fergason | 350/331 R |
| 4,616,903 | 10/1986 | Fergason | 350/334 |
| 5,006,422 | 4/1991 | Sakurai et al. | 428/694 |
| 5,060,011 | 10/1991 | Yamamoto et al. | 355/27 |
| 5,097,286 | 3/1992 | Sakai | 355/27 |

FOREIGN PATENT DOCUMENTS 1-298375A 12/1989 Japan.

Primary Examiner—A. T. Grimley
Assistant Examiner—Christopher Horgan
Attorney, Agent, or Firm—Guy W. Shoup; David W. Heid; B. Noel Kivlin

[57] ABSTRACT

According to the present invention, an image forming apparatus uses a photoconductive member in which microcapsules with a liquid crystal material sealed therein are dispersed inside of a photoconductive layer thereof and comprises a charger for uniformly charging the photoconductive member and an LED head for forming an electrostatic latent image on the photoconductive member, and furthermore, comprises a voltage applying device for applying an alternating electric field to the photoconductive member so as to make the electrostatic latent image visible by the phase transition of the liquid crystal material, and a toner sticking device for sticking toner to the photoconductive member so as to make the electrostatic latent image visible. Therefore, it is possible to easily obtain both a display image and a printed image having high resolution.

5 Claims, 3 Drawing Sheets

IMAGE FORMING APPARATUS WITH MICROCAPSULES DISPERSED IN THE PHOTOCONDUCTIVE MEMBER

BACKGROUND OF THE INVENTION

1. Field of the Invention

The present invention relates to an image forming apparatus which utilizes the electrophotography method, and more particularly to an image forming apparatus which forms an electrostatic latent image on a photoconductive member by a light emitting diode (LED) head and makes the latent image visible so as to perform an image display, and furthermore forms a hard copy by developing the latent image with toner and transferring the developed image onto a predetermined sheet.

2. Description of Related Art

Among various kinds of printing apparatus, printing apparatus with displays, such as a small CRT and a liquid crystal, have been recently developed. These displays make it possible to display an image before the image is formed on a sheet and to confirm the image to be printed.

On the other hand, a well-known type of conventional electrophotographic apparatus forms an electrostatic latent image on a photoconductive member, makes the latent image visible by sticking toner to the latent image by a developing device and forms the desired display image. In such an electrophotographic apparatus, a window for visual confirmation made of, for example, glass, is mounted in the body of the apparatus and a toner image formed on a photoconductive member is moved to the visual confirmation window where it can be visually confirmed from the outside.

However, since the printing apparatus with a display uses a display, such as a small CRT or a liquid crystal, as a display device, an image to be printed cannot be displayed with high resolution due to the structure of the apparatus, and furthermore, the displayed image is extremely small. In order to display a large image with high resolution, it is necessary to make the display large. As a result, the whole apparatus becomes large.

In the electrophotographic apparatus which displays a toner image, since a CRT and a liquid crystal display are unnecessary, it is possible to easily display a relatively large image with high resolution in a relatively narrow space. However, the toner stuck onto the photoconductive belt scatters, sticks to a glass plane or the like at the visual confirmation window and contaminates the window. As a result, visibility of the toner image is lowered in an extremely short period.

SUMMARY OF THE INVENTION

With these problems in view, an object of the present invention is to provide an image forming apparatus which can display a large image having high resolution for a long time without making the apparatus large and which can issue a hard copy of the displayed image on a sheet as the occasion demands.

Another object of the present invention is to provide an image forming apparatus having a photoconductive member inside of the body of the apparatus, a charger for uniformly charging the photoconductive member and an LED head for forming an electrostatic latent image (on which to stick toner) on the photoconductive member based on a desired image signal, the charger and the LED head being disposed adjacent to the photoconductive member. In the image forming apparatus, microcapsules, in which a liquid crystal material is sealed, are dispersed inside of a photoconductive layer of the photoconductive member and a voltage applying device for making the electrostatic latent image visible by applying an alternating electric field to the photoconductive member and a toner sticking means for making the electrostatic latent image visible by sticking toner to the photoconductive member are disposed downstream of the LED head.

According to the present invention, the microcapsules in the photoconductive member become transparent upon uniform charging of the photoconductive member by the charger and the charges on parts that are irradiated by light among charges of the photoconductive layer of the photoconductive member are lost by operating the LED head based on desired image signals and exposing the photoconductive member, so that an electrostatic latent image is formed. Since the electric field greatly changes on the parts from which the charges are lost by the light from the LED, the liquid crystal material in the microcapsules causes a phase transition by applying the voltage to the photoconductive member and only the part to which the light is radiated by the LED head becomes opaque. Then, by moving the part of the photoconductive member where an image is formed to the visual confirmation window, the image on the photoconductive member can be visually confirmed.

Furthermore, in order to form a hard copy of the image, the electrostatic latent image is developed by sticking toner to the electrostatic latent image without applying the voltage by the voltage applying device and the developed image is transferred onto a sheet and fixed, so that an image is obtained on the sheet.

DETAILED DESCRIPTION OF THE PREFERRED EMBODIMENTS

Preferred embodiments of the present invention will now be described with reference to FIGS. 1 to 5.

Figure 1:
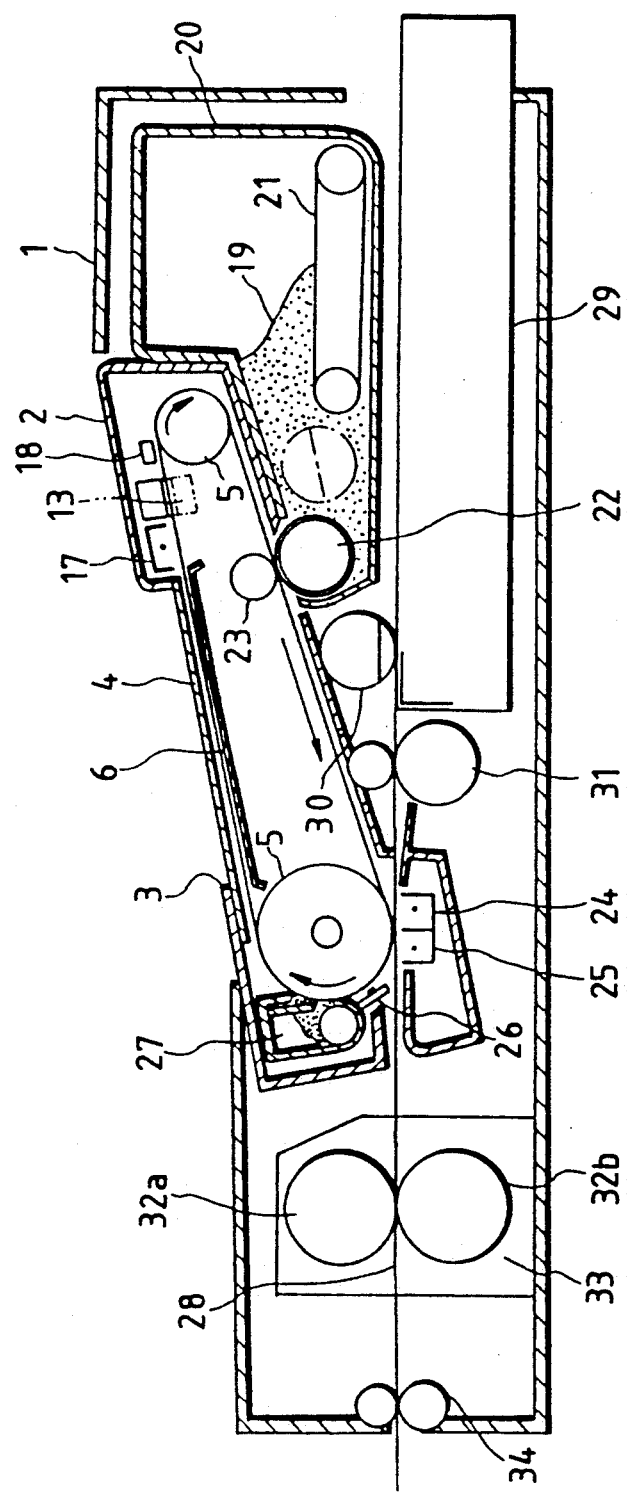
FIG. 1 is a vertical sectional view of an embodiment of an image forming apparatus according to the present invention.
Figure 2:
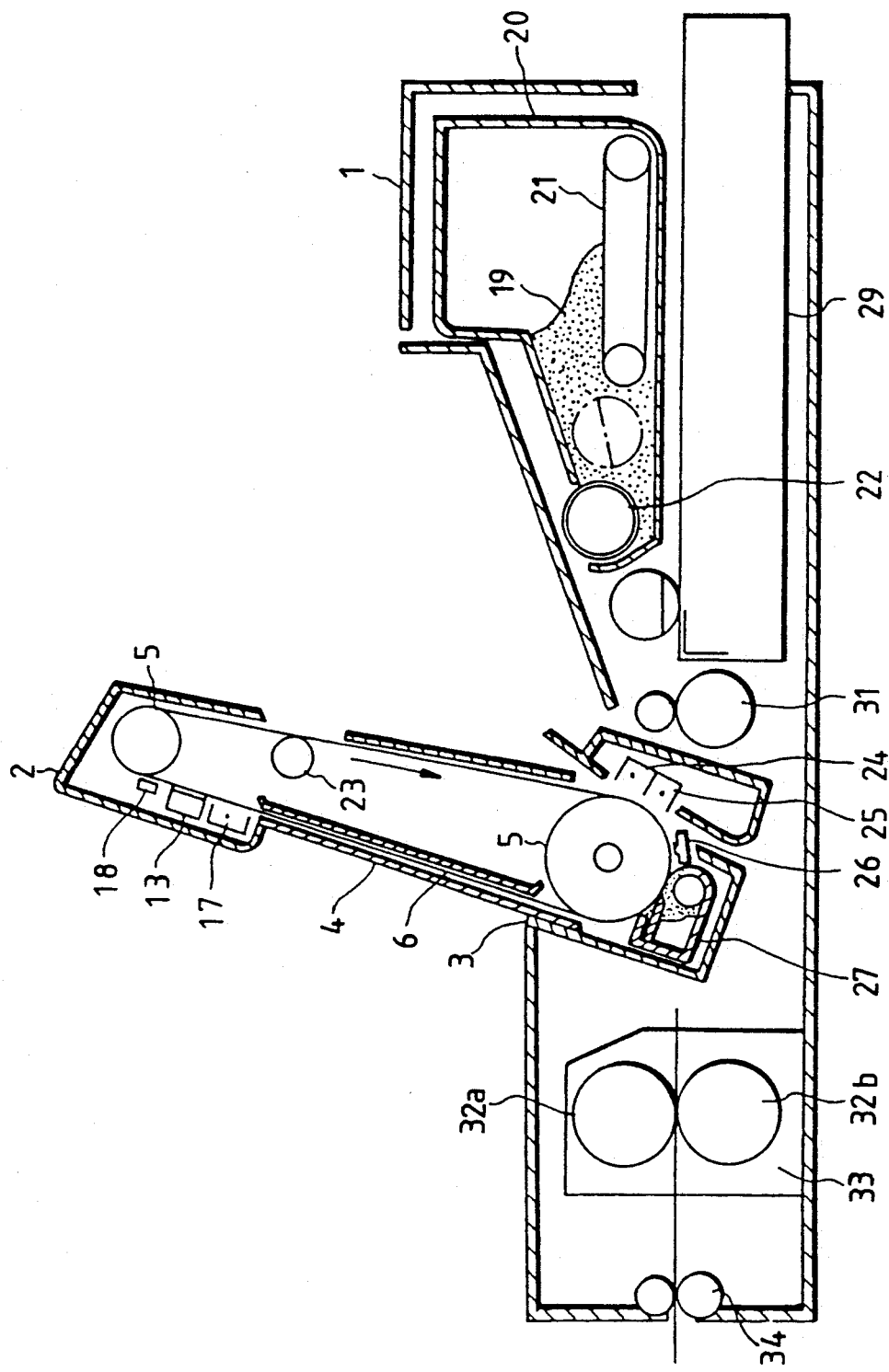
FIG. 2 is a vertical sectional view showing the state in which a display unit shown in FIG. 1 is raised.
Figure 3:
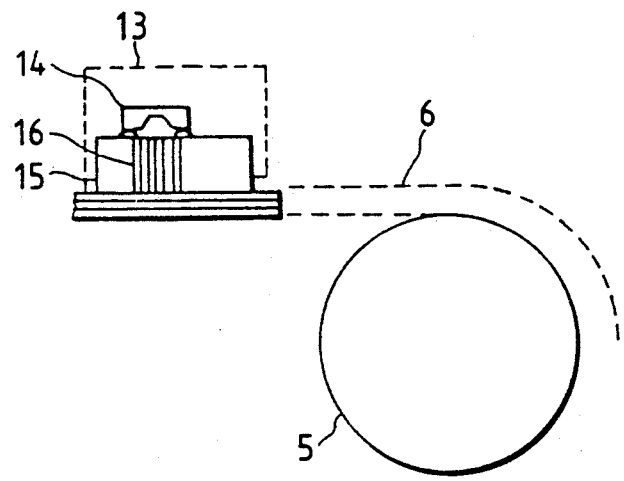
FIG. 3 is an enlarged sectional view of an LED head portion.

FIGS. 1 to 3 show an embodiment of an image forming apparatus according to the present invention. In a box-shaped body 1, a display unit 2, which is separate from the body 1, is mounted rotatably upward on one end thereof. A visual confirmation opening 3 is formed on the upper plane of the display unit 2. A transparent glass filter 4 is fixed to the portion of the visual confirmation opening 3 of the display unit 2 so as to cover the visual confirmation opening 3. A photoconductive belt 6 hung between a pair of driving rollers 5 and 5 is disposed inside of the display unit 2.

Figure 4A:
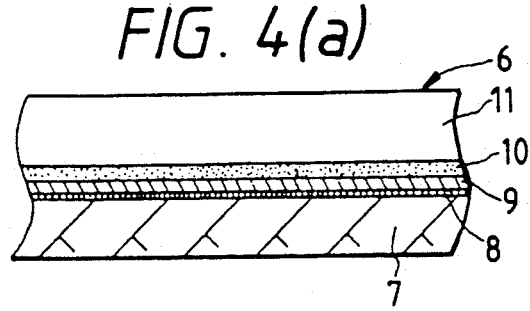
FIG. 4(a) is a sectional view of a photoconductive belt.
Figure 4B:
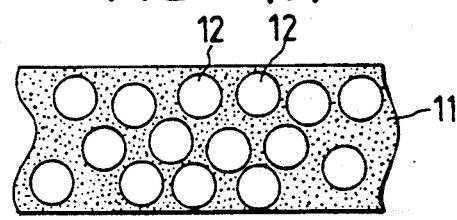
FIG. 4(b) is an enlarged sectional view of a charge transporting layer.

In the photoconductive belt 6, as shown in FIG. 4(a), a conductive layer 8 made of, for example, indium oxide or aluminum, is formed on a base material 7 made of synthetic resin, such as polyethylene terephthalate (PET), and a subbing layer 9 made of polyvinyl pirrolidone or the like is formed on the conductive layer 8. A charge generating layer 10 made of an organic photoconductive material for generating charges by light radiation and a charge transporting layer 11 of holding the charges are piled respectively on the subbing layer 9. Furthermore, in this embodiment, as shown in FIG. 4(b), a lot of microcapsules 12, 12, . . . with a liquid material sealed therein, are uniformly dispersed inside of the charge transporting layer 11. The microcapsule 12 is made of a ferroelectric liquid crystal or the like, for example, CS-1019 (manufactured by Chisso Corp.), which has the characteristics of causing a phase transition between a transparent state which lets light through and an opaque state which scatters light by being applied with a specific voltage and maintaining each of these states until a specific voltage is applied.

An LED head 13 is disposed in contact with or adjacent to the upper outer periphery of the photoconductive belt 6. As shown in FIG. 3, the LED head 13 has an LED array 14 which emits light based on predetermined image signals. A base member 15 is disposed adjacent to the LED array 14 and a bundle of optical fibers 16 which penetrate the base member 15 are buried in the position of the base member 15 corresponding to the light emitting portion of the LED array 14. The light radiated from the LED array 14 passes inside of the bundle of optical fibers 16, is radiated onto the photoconductive belt 6 for exposure and forms a desired electrostatic latent image.

A charger 17 for uniformly applying charges to the photoconductive belt 6 so as to put the photoconductive belt 6 into a writable state is disposed upstream from the LED head 13 on the photoconductive belt 6, and an alternating voltage applying device 18 for applying a specific electric field to the microcapsule 12 in the charge transporting layer 11 of the photoconductive belt 6 is disposed downstream from the LED head 13 on the photoconductive belt 6.

Furthermore, a developing device 20 for making visual the electrostatic latent image formed on the photoconductive belt 6 by sticking toner 19 to the electrostatic latent image is disposed downstream from the voltage applying device 18 on the photoconductive belt 6. A toner sticking roller 22 for sticking the toner 19 transported by a toner transporting belt 21 onto the surface of the photoconductive belt 6 is mounted inside of the developing device 20. A supplementary roller 23 is disposed corresponding to the toner sticking roller 22 inside of the photoconductive belt 6. Furthermore, a transfer device 24 for transferring the toner 19 onto a sheet, described below, a separating charger 25 next to the transfer device 24, a discharger 26 having a light source for removing residual potential on the photoconductive belt 6, and a cleaner 27 for removing the residual toner 19 on the photoconductive belt 6, are disposed in this order downstream from the developing device 20 on the photoconductive belt 6.

A sheet supply device 29 containing sheets 28 therein is detachably mounted on one side of the body 1, and a hopping roller 30 for taking out the sheets 28 in the sheet supply device 29 one by one and a sheet supply roller 31 for transporting the sheets 28 between the photoconductive belt 6 and the transfer device 24 are disposed adjacent to the sheet supply device 29. A fixing device 33 which contains a heat roller 32a and a press roller 32b therein is mounted downstream from the transfer device 24 in the feeding direction of the sheet 28. An eject roller 34 which ejects the sheet 28 from the rear of the body 1 is mounted downstream from the fixing device 33.

Operations of this embodiment will now be described.

In order to form a desired image on the sheet 28 and obtain a hard copy thereof, the sheet 28 in the sheet supply device 29 is taken out by the hopping roller 30 and fed toward the transfer device 24 by the sheet supply roller 31. Then, after the photoconductive belt 6 is put into a writable state by the charger 17, an electrostatic latent image is formed on the photoconductive belt 6 by the LED head 13 based on predetermined print signals. In this case, the voltage applying device 18 is not operated. A visual image is obtained by sticking the toner 19 to the electrostatic latent image formed on the photoconductive belt 6 by the toner sticking roller 22 of the developing device 20, and the toner 19 is transferred onto the upper plane of the sheet 28 transported by the sheet supply roller 31 by the transfer device 24. After that, the sheet 28 is separated from the photoconductive belt 6 by the separating charger 25, fed between the heat roller 32a and the press roller 32b of the fixing device 33 and passes through the fixing device 33, so that the transferred toner image is fixed. Then, the sheet 28 is ejected from the rear of the body 1 by the eject roller 34.

On the other hand, by removing the residual potential on the photoconductive belt 6 by the discharger 26 and the residual toner 19 on the photoconductive belt 6 by the cleaner 27, the photoconductive belt 6 is put into a chargeable state again.

Figure 5A:
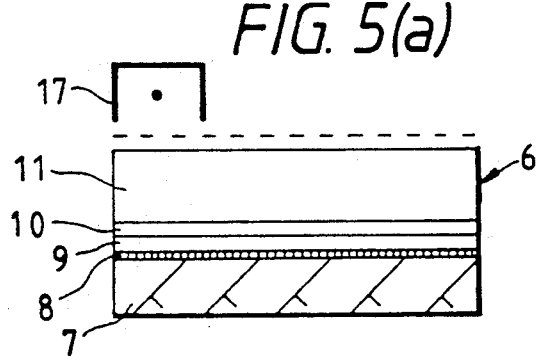
FIG. 5(a) is a sectional view showing the state of in which the photoconductive belt is charged.
Figure 5B:
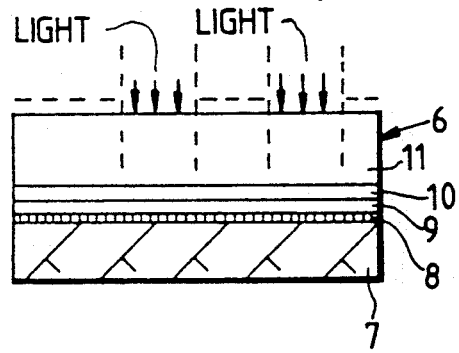
FIG. 5(b) is a sectional view showing the state in which the photoconductive belt is exposed by the LED head.

In order to display an image, the display unit 2 is rotated above the body 1 and raised. In this state, as shown in FIG. 5(a), the surface of the photoconductive belt 6 is uniformly charged with the negative potential of $-300$ V to $-600$ V, thereby making the microcapsules 12 in the charge transporting layer 11 of the photoconductive belt 6 transparent. After that, by operating the LED head 13 based on desired image signals and exposing the photoconductive belt 6, as shown in FIG. 5(b), the charges in the parts to which the light is radiated among the charges in the charge transporting layer 11 of the photoconductive belt 6 are lost. At this time, if an image is formed on the sheet 28, since the exposure by the LED head 13 is intended to transfer the image formed on the photoconductive belt 6 onto the sheet 28, the image formed on the photoconductive belt 6 is laterally opposite to a normal image, while if the image is displayed, the image formed on the photoconductive belt 6 is visually confirmed as it is, and furthermore, it is necessary to reduce the image with respect to the image to be transferred onto the sheet 28 depending upon the size of the glass filter 4 of the visual confirmation opening 3. Therefore, in this embodiment, the desired image signals are taken out of an image input data memory, bit map data of the image to be displayed is previously reversed, reduced and developed in the page memory, and the LED head 13 is operated based on the reversed and reduced image data.

Figure 5C:
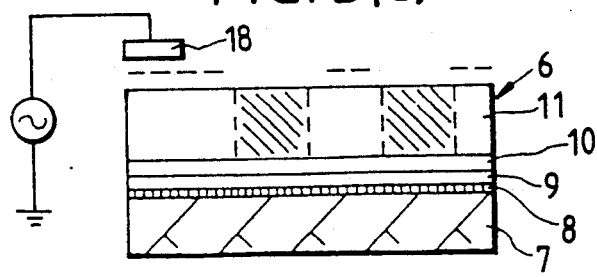
FIG. 5(c) is a sectional view showing the state in which the photoconductive belt is applied with the voltage by a voltage applying device.

Subsequently, by operating the voltage applying device 18 and applying the voltage of 10 V to 100 V and the alternating electric field having the frequency of 200 Hz to 500 Hz to the photoconductive belt 6, as shown in FIG. 5(c), since the electric field greatly changes on the parts in which the charges are lost by the LED head 13, the liquid crystal materials in the microcapsules 12 causes the phase transition and only the parts to which the light is radiated by the LED head turn opaque. Then, by moving the photoconductive belt 6 so as to move the part where the image is formed to the glass filter 4 of the display unit 2, the image on the photoconductive belt 6 can be visually confirmed. Since the display unit 2 is apart from the developing device 20 of the body 1 at this time, it is possible to prevent the toner 19 from sticking to the photoconductive belt 6 and to prevent the toner 19 from sticking to the glass filter 4 and deteriorating the display state.

Therefore, in this embodiment, since a display image is formed and visually confirmed by causing the phase transition in the liquid crystal material in the microcapsules 12 of the photoconductive belt 6 without using a toner image, a specific display device, such as a CRT, is unnecessary, and it is possible to obtain a large display image having an extremely high resolution without making the apparatus large. Furthermore, since the photoconductive belt 6 with the toner 19 stuck thereto is not in a position corresponding to the glass filter 4, it is possible to certainly prevent the toner 19 from contaminating the glass filter 4.

If the image is displayed, since the toner 19 is prevented from sticking to the photoconductive belt 6 by prohibiting the developing device 20 from operating, even if the display unit 2 lies down as shown in FIG. 1, the image on the photoconductive belt 6 can be visually confirmed through the glass filter 4 which lies down.

As shown by the chain line in FIG. 1, the photoconductive belt 6 may be exposed through the transparent base member 7 by mounting the LED head 13 inside of the photoconductive belt 6 and making the base material 7 which is the inmost layer of the photoconductive belt 6 transparent.

The present invention is not limited to the above embodiment and may be changed as necessity requires.

As described above, since an image forming apparatus of the present invention does not use a toner image and forms a display image by causing the phase transition in the liquid crystal material in the microcapsules of the photoconductive member and makes the display image visually confirmed, a specific display device, such as a CRT, is unnecessary and it is possible to obtain a large display image having an extremely high resolution without making the apparatus large. Furthermore, since a hard copy of the displayed image can be obtained by using the toner if necessary, one apparatus can serve both as a display apparatus and a printing apparatus having high resolution.

In addition, since the toner image is not visually confirmed, it is possible to reliably prevent the toner from contaminating the part where the displayed image is visually confirmed and to display a clear image for a long time.

What is claimed is:

1. In an image forming apparatus including a photoconductive member having a photoconductive layer arranged within a body thereof, an electrical charger for uniformly charging said photoconductive member, and an LED head for forming an electrostatic image by causing toner to adhere to said photoconductive member in response to a desired image signal, said LED head disposed adjacent to said photoconductive member, wherein the improvement comprises:
   microcapsules with a liquid crystal material sealed therein dispersed inside of said photoconductive layer of said photoconductive member;
   a voltage applying device for providing an alternating electric field to said photoconductive member so as to make a variation in phase of said liquid crystal material in said microcapsules which are dispersed in said photoconductive layer and to make said electrostatic latent image visible;
   and toner sticking means for selectively sticking the toner to said photoconductive member so as to make said electrostatic latent image visible, said toner sticking means mounted downstream from said LED head.

2. An image forming apparatus according to claim 1, wherein an opening for visually confirming the image made visible by said voltage applying device therethrough is formed adjacent to said photoconductive member.

3. An image forming apparatus according to claim 1, wherein said photoconductive member is a photoconductive belt.

4. An image forming apparatus according to claim 3, wherein said LED head is disposed inside of said photoconductive belt.

5. An image forming apparatus having a display unit comprising:
   a body;
   a photoconductive member having a photoconductive layer and disposed in said body, said photoconductive layer including a plurality of microcapsules with a liquid crystal material sealed therein;
   a charger disposed adjacent to said photoconductive member;
   an LED head positioned adjacent said photoconductive member for forming an electrostatic latent image on said photoconductive member based on desired image signals;
   a voltage applying device positioned adjacent said photoconductive member for applying an alternating electric field to said photoconductive member; and
   toner sticking means for selectively sticking toner to said electrostatic latent image so as to make said electrostatic latent image visible in a hard copy, said toner sticking means mounted in said body of said apparatus;
   wherein said display unit is rotatably mounted in said body of said apparatus.

* * * * *